United States Patent
Lowery et al.

(10) Patent No.: US 9,294,216 B2
(45) Date of Patent: Mar. 22, 2016

(54) OPTICAL OFDM TRANSMISSION (75) Inventors: Arthur James Lowery, Victoria (AU); Liang Bangyuan Du, Victoria (AU)

(73) Assignee: OFIDIUM PTY. LTD., Melbourne (AU)

( * ) Notice: Subject to any disclaimer, the term of this patent is extended or adjusted under 35 U.S.C. 154(b) by 18 days.

(21) Appl. No.: 14/002,856

(22) PCT Filed: Mar. 2, 2012

(86) PCT No.: PCT/AU2012/000209
§ 371 (c)(1),
(2), (4) Date: Nov. 18, 2013

(87) PCT Pub. No.: WO2012/116406
PCT Pub. Date: Sep. 7, 2012

(65) Prior Publication Data
US 2014/0294393 A1    Oct. 2, 2014

(30) Foreign Application Priority Data
Mar. 3, 2011    (AU) .................................. 2011900729

(51) Int. Cl.
*H04J 14/02*    (2006.01)
*H04L 5/00*    (2006.01)
*H04B 10/548*    (2013.01)
*H04B 10/2575*    (2013.01)
*H04L 27/26*    (2006.01)

(52) U.S. Cl.
CPC ........ *H04J 14/0298* (2013.01); *H04B 10/2575* (2013.01); *H04B 10/548* (2013.01); *H04L 5/0007* (2013.01); *H04L 5/0046* (2013.01); *H04L 27/2601* (2013.01)

(58) Field of Classification Search
CPC . H04L 5/0007; H04L 5/0046; H04L 27/2601; H04J 14/0298; H04B 10/2575; H04B 10/548
See application file for complete search history.

(56) References Cited

U.S. PATENT DOCUMENTS

| 9,042,251 | B2* | 5/2015 | Berg et al. ...................... 370/252 |
| 2003/0210645 | A1* | 11/2003 | Gummadi et al. ............. 370/203 |
| 2009/0190929 | A1 | 7/2009 | Khurgin et al. |
| 2010/0021163 | A1 | 1/2010 | Shieh |
| 2010/0086303 | A1 | 4/2010 | Qian et al. |
| 2010/0178057 | A1 | 7/2010 | Shieh |
| 2010/0220376 | A1 | 9/2010 | Kobayashi et al. |
| 2010/0247099 | A1 | 9/2010 | Lowery et al. |
| 2011/0038403 | A1* | 2/2011 | Ichihara et al. ................ 375/222 |
| 2011/0305462 | A1* | 12/2011 | Buelow ......................... 398/158 |
| 2013/0209101 | A1* | 8/2013 | Hui et al. ......................... 398/50 |

* cited by examiner

*Primary Examiner* — Leslie Pascal
(74) *Attorney, Agent, or Firm* — Baker & Hostetler LLP (57) ABSTRACT

A method for transmitting digital information having a predetermined bit-rate (B) via a nonlinear optical channel includes determining a combination of transmission parameters comprising a number (N) of subcarriers, an information symbol rate (S) for each subcarrier, and a number (b) of bits per symbol on each subcarrier, such that B=NSb. An optical signal is generated comprising the plurality (N) of orthogonal optical subcarriers. Each subcarrier is modulated to carry a proportion (Sb/B) of the total bit-rate (B) of the digital information. The optical signal is then transmitted to a corresponding optical receiver via the nonlinear optical channel. The received signal has a measurable signal quality (Q) which is a function of the transmission parameters (N, S, b). Determining the combination of transmission parameters comprises selecting the parameters such that the associated signal quality is greater than a corresponding quality for a single-carrier transmission, and greater than a corresponding quality employing a larger number (M>N) of subcarriers.

12 Claims, 3 Drawing Sheets

OPTICAL OFDM TRANSMISSION

CROSS-REFERENCE TO RELATED APPLICATIONS

This application is the National Stage of International Application No. PCT/AU2012/000209, filed Mar. 2, 2012, which claims the benefit of Australian Application No. 2011900729, filed Mar. 3, 2011, the disclosures of which are incorporated herein by reference in their entireties.

FIELD OF THE INVENTION

The present invention relates to optical communications systems, and more particularly to improvements in high-density Optical Frequency Division Multiplexed or Wavelength Division Multiplexed transmission.

BACKGROUND OF THE INVENTION

The maximum capacity and/or transmission distance in optical fibre communications links is no longer limited primarily by linear processes, such as chromatic dispersion and polarisation mode dispersion (PMD), or by additive noise. A variety of optical and electronic technologies are available, for use in incoherent and coherent communications links, which are able to fully compensate for linear dispersion effects. In addition, efficient and cost-effective optical amplification technologies, such as Erbium-Doped Fibre Amplifiers (EDFAs) are able to boost transmitted signal power in order to maintain an adequate Optical Signal-to-Noise Ratio (OSNR) for reliable recovery of the transmitted information.

As a result, the ultimate limit of transmission capacity and/or reach is generally nonlinear propagation effects, such as cross-phase modulation (XPM) in single-mode optical fibres. Amplifying the transmitted signals to ever-higher power levels results in excessive distortion due to optical nonlinearities. To avoid this, transmitted signal power must be limited, which reduces the available OSNR. In practice, the transmission of optical signals close to the limits of capacity and/or reach requires a trade-off between the nonlinear distortion and the accumulated optical noise in order to achieve an adequate quality in the received signal.

Further improvements in the transmission capacity or reach of optical links may be achieved by compensating for, or at least mitigating, the nonlinear distortions. Computational techniques are known that are able to substantially reverse (within limits determined by the presence of random noise processes) the nonlinear signal distortions. For example, for every real optical fibre transmission link there exists a corresponding theoretical 'inverse link', having characteristics that are precisely the reverse of the real link. While the 'inverse link' does not exist in reality, it may be simulated using computational techniques applied to an inverse link model. Propagation through the inverse link model may be computed either at the transmitting end, whereby a predistorted signal is transmitted and the predistortion reversed in the transmission link, or at the receiver, whereby a distorted signal is detected, and propagation through the inverse link model is simulated in order to recover the transmitted signal.

The inverse model technique is, however, highly computationally intensive. As a result, it is impractical to perform the necessary pre-compensation or post-compensation in real-time on a live optical transmission link. Solutions to this problem include pre-calculating suitable predistorted waveforms corresponding with various transmitted symbol sequences, or employing simplified computational techniques for mitigating nonlinear effects in real-time. All such approaches are, however, necessarily approximations to a full compensation calculation, and therefore achieve imperfect results.

Whether or not nonlinear mitigation technologies are employed, it is therefore desirable to use transmission formats that are relatively robust to nonlinear effects. In particular, it has been recognised that transmitting information over an optical link in the form of a number of lower bandwidth signals at different frequencies, e.g. via various Wavelength Division Multiplexing (WDM), optical frequency division multiplexing or Subcarrier Multiplexing (SCM) techniques, improves the nonlinear performance, because each of the narrower bandwidth channels is more robust in the presence of nonlinear effects than a corresponding single high bit-rate channel. For example, Optical Orthogonal Frequency Division Multiplexing (O-OFDM) transmits data on multiple lower-rate subcarriers in parallel, and employs a subcarrier spacing equal to the symbol rate of each subcarrier in order to achieve high spectral efficiency while avoiding linear crosstalk. Electrically-generated O-OFDM typically uses long symbols corresponding with hundreds of closely spaced subcarriers. This contrasts, at the other extreme, with conventional high bit-rate single-carrier systems, in which one high symbol-rate signal is transmitted on each optical wavelength carrier. Between these two extremes, systems have been developed such as No-Guard Interval (No-GI) coherent optical OFDM, coherent WDM, and Nyquist WDM, which employ optically-generated subcarriers that are orthogonal or near-orthogonal. Symbol lengths in such systems are shorter than electrically generated O-OFDM, but longer than single carrier systems.

It has been shown experimentally and theoretically that a large number of orthogonal carriers can be used to form a continuous optical spectrum capable of transmitting signals of in excess of 1 Tb/s.

Due to the very high potential capacity of such systems, it is desirable to provide further improvements to their performance in the presence of nonlinear propagation effects. It is, accordingly, an object of the present invention to provide such improvements.

SUMMARY OF THE INVENTION

In one aspect, the present invention provides a method of transmission of digital information having a predetermined bit-rate (B) via a nonlinear optical channel, the method comprising the steps of:

determining a combination of transmission parameters comprising a number (N) of subcarriers, an information symbol rate (S) for each subcarrier, and a number (b) of bits per symbol on each subcarrier, wherein B=NSb;

generating an optical signal comprising the plurality (N) of orthogonal optical subcarriers, wherein each subcarrier is modulated to carry a proportion (Sb/B) of the total bit-rate (B) of the digital information; and transmitting the optical signal to a corresponding optical receiver via the nonlinear optical channel, wherein the optical signal received at the optical receiver has a measurable signal quality (Q) which is a function of the transmission parameters (N, S, b), and the step of determining the combination of transmission parameters comprises selecting the parameters such that the associated signal quality is greater than a corresponding quality for a single-carrier transmission, and greater than a corresponding quality employing a larger number (M>N) of subcarriers.

The invention thus essentially subsists in multiplexing the digital information across a plurality of orthogonal subcarriers, wherein the number of subcarriers, the symbol rate, and the number of bits per symbol, are determined so as to provide an improvement in the nonlinear propagation performance of the transmitted signal, as compared with either a conventional single-carrier system, and a high-density subcarrier multiplexed system, such as a conventional electrically-generated O-OFDM transmission system. In this regard, it is a particular discovery of the present inventors that there generally exists, for any given optical transmission link, a trade-off amongst the transmission parameters that will result in such an improvement.

Preferably, an optimum combination of transmission parameters is determined wherein the quality (Q) of the received signal comprising the number (N) of subcarriers is greater than the quality of a corresponding signal having any greater or lesser number of subcarriers.

In accordance with embodiments of the invention, the step of generating the optical signal comprises:

encoding the digital information into a plurality (N) of subcarrier channels, each channel comprising a modulated signal of the common information symbol rate (S) and the common number of bits per symbol (b);

providing a plurality (N) of optical sources, configured such that a frequency spacing between the optical fields of adjacent sources is equal to the information symbol rate (S);

modulating each optical source with one of said subcarrier channels to produce a corresponding optical subcarrier channel; and optically combining the modulated subcarrier channels to produce an O-OFDM signal.

In other embodiments, the step of generating an optical signal comprises:

encoding the digital information into a plurality (N) of subcarrier channels, each channel comprising a modulated signal of the common information symbol rate (S) and the common number of bits per symbol (b);

combining the plurality (N) of subcarrier channels to produce an electrical OFDM signal; and modulating an optical source with the electrical OFDM signal to produce a corresponding O-OFDM signal.

In another aspect, the invention provides an optical transmitter adapted for transmission of digital information having a predetermined bit-rate (B) via a nonlinear optical channel, the transmitter comprising:

a plurality (N) of signal generators configured to encode the digital information into a corresponding plurality of subcarrier channels, each channel comprising a modulated signal having an information symbol rate (S) and a number of bits per symbol (b), wherein B=NSb;

a plurality (N) of optical sources, each having a modulation input operatively coupled to a subcarrier channel output of a corresponding one of the signal generators and configured to modulate an optical carrier with the corresponding subcarrier channel to generate an optical signal output, the plurality of optical sources being configured such that a frequency spacing between the optical fields of adjacent sources is equal to the information symbol rate (S); and an optical combiner having a plurality (N) of optical inputs, each of which is operatively coupled to the optical signal output of a corresponding one of said optical sources, the combiner being configured to combine the modulated subcarrier channels to produce an O-OFDM signal.

In yet another aspect, the invention provides an optical transmitter adapted for transmission of digital information having a predetermined bit-rate (B) via a nonlinear optical channel, the transmitter comprising:

at least one multiplexed signal generator configured to encode the digital information into a plurality (N) of subcarrier channels, each channel comprising a modulated signal having an information symbol rate (S) and a number of bits per symbol (b), wherein B=NSb, and to combine the plurality (N) of subcarrier channels to produce an electrical OFDM signal at a multiplexed signal output; and a optical source having a modulation input operatively coupled to the multiplexed signal output and configured to modulate an optical carrier with the electrical OFDM signal to produce a corresponding O-OFDM signal.

In some embodiments, the multiplexed signal generator comprises a frequency-time transformer, such as a discrete Fourier transform processor, configured to receive a plurality (N) of frequency-domain input symbols each comprising the plurality (b) of bits, and to generate a corresponding plurality (N) of time-domain output values comprising the multiplexed signal output.

In a further aspect the present invention provides a method of transmission of digital information having a predetermined bit-rate (B) via a nonlinear optical channel, the method comprising the steps of:

determining a combination of transmission parameters comprising a number (N) of subcarriers, an information symbol rate ($S_i$) for each subcarrier ($1 \leq i \leq N$), and a number ($b_i$) of bits per symbol on each subcarrier (i), wherein $$B = \sum_{i=1}^{N} S_i b_i;$$

generating an optical signal comprising the plurality (N) of orthogonal optical subcarriers, wherein each subcarrier (i) is modulated to carry a proportion ($S_i b_i / B$) of the total bit-rate (B) of the digital information; and transmitting the optical signal to a corresponding optical receiver via the nonlinear optical channel, wherein the optical signal received at the optical receiver has a measurable signal quality (Q) which is a function of the transmission parameters (N, $S_1 \ldots S_N$, $b_1 \ldots b_N$), and the step of determining the combination of transmission parameters comprises selecting the parameters such that the associated signal quality is greater than a corresponding quality for a single-carrier transmission, and greater than a corresponding quality employing a larger number (M>N) of subcarriers.

Further aspects, features and benefits of the present invention, and embodiments thereof, will be apparent from the following description, which is nonetheless not intended to be limiting of the scope of the invention as defined in any of the foregoing statements, or in the claims appended hereto.

BRIEF DESCRIPTION OF THE DRAWINGS

Preferred embodiments of the invention will now be described with reference to the accompanying drawings, in which.

DESCRIPTION OF PREFERRED EMBODIMENTS

Figure 1A:
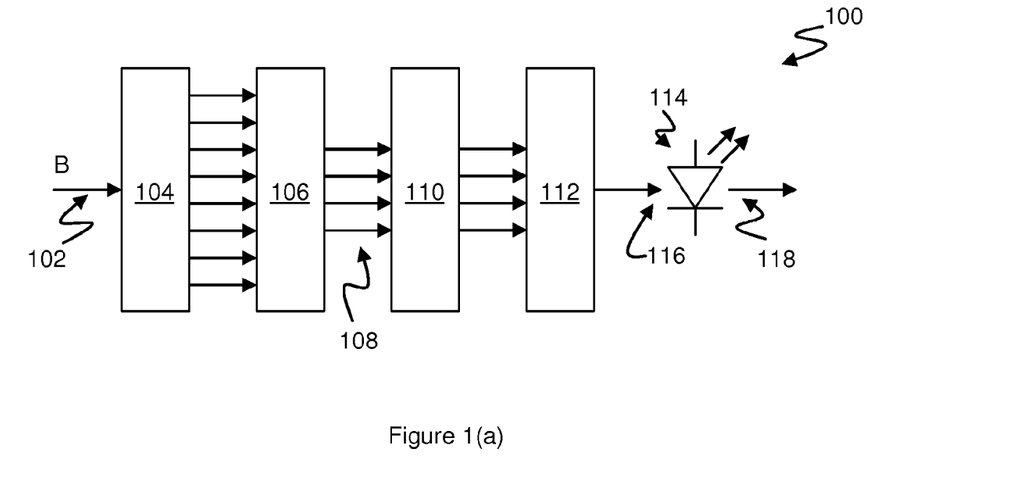
FIG. 1(a) is a block diagram illustrating an optical transmitter according to one embodiment of the invention.

FIG. 1(a) is a block diagram illustrating an optical transmitter 100 according to one embodiment of the invention.

The transmitter 100 receives as input a serial information signal 102 having a predetermined bit-rate B, and comprises a multiplexed signal generator including a serial-to-parallel converter 104, a subcarrier modulator 106, a frequency-time transformer 110 and a multiplexed output processor 112.

The serial-to-parallel converter 104 provides a block of parallel digital inputs to the subcarrier modulator 106, which comprises a plurality of mapping units for generating a corresponding plurality of data symbols, each of which is generally a complex value encoding a number (b) of the input information bits 102. In general, each data symbol may encode more than one information bit, so that the number (N) of outputs 108 from the subcarrier modulator 106 is less than the number of parallel bit inputs. Symbols are generated at the outputs 108 at a symbol rate (S) which depends upon the input bit-rate B, the number of parallel inputs to the subcarrier modulator 106, and the number of bits per symbol (b). In general, B=NSb.

According to one embodiment of the transmitter 100, a QAM mapping, such as a 4-QAM mapping, is used by the mapping units of the subcarrier multiplexer 106 to in order to provide the resulting encoded data symbol values. Each QAM symbol value is a complex number representing the amplitude and phase modulation to be applied to a corresponding frequency subcarrier of the transmitted signal. It will be appreciated, however, that alternative mapping schemes may be used for encoding of the input data, including, but not limited to, on-off keying (OOK), amplitude shift keying (ASK), phase shift keying (PSK), frequency shift keying (FSK) and so forth.

The frequency-time transformer 110 is preferably implemented using a discrete Fourier transform (DFT) processor, for example based upon a fast-Fourier transform algorithm/architecture, to generate a block of transformed values which are input to the multiplexed output processor 112. As will be appreciated, the IDFT may readily be implemented using either digital electronic hardware or software means, or a combination of hardware and software, as well known in the art. The output of the frequency-time transformer 110 is generally a digital sampled OFDM signal waveform, in a parallel format, comprising a plurality (N) of orthogonal subcarriers corresponding with the encoded symbols output from the subcarrier modulator 106.

In the embodiment of the transmitter 100 as shown, the multiplexed output processor 112 comprises two principal functions. Firstly, it converts the parallel input waveform samples into a corresponding serial sequence, and secondly it includes one or more analogue-to-digital converters (ADC's) which convert the serial sampled waveform into a corresponding multiplexed waveform provided at output 116. The output is used as input to an optical source 114, which comprises an optical carrier generator (e.g. a semiconductor laser, or similar) which is modulated to produce an O-OFDM output signal 118.

In various embodiments, the output 116 comprises one or more analogue signals. By way of example, a single output signal may be generated from a purely real-valued output of the subcarrier modulator 106 and frequency-time transformer 110, which may be used to modulate a single characteristic of an optical carrier, such as intensity or phase. In another example, two output signals may be generated corresponding with real and imaginary parts of a complex-valued output of the subcarrier modulator 106 and frequency-time transformer 110, which may be used to modulate two characteristics of an optical carrier, such as amplitude and phase, or in-phase and quadrature components. In yet another example, four output signals may be generated corresponding with real and imaginary parts of alternate complex-valued outputs of the subcarrier modulator 106 and frequency-time transformer 110 (i.e. at half the sample rate per output) which may be used to modulate four characteristics of an optical carrier, such as amplitude and phase, or in-phase and quadrature components, of two orthogonal polarisation states. Various suitable configurations of the optical source 114, for implementing each of these exemplary cases, are known in the art of optical communications.

Figure 1B:
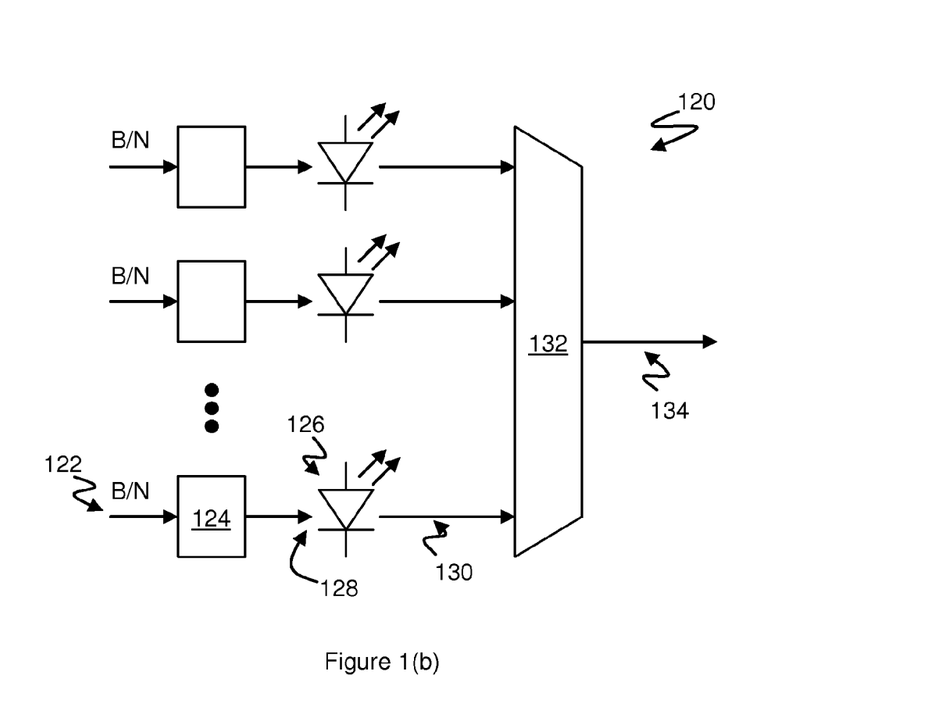
FIG. 1(b) is a block diagram illustrating an optical transmitter according to another embodiment of the invention.

FIG. 1(b) is a block diagram illustrating an optical transmitter 120 according to another embodiment of the invention.

The transmitter 120 receives as input a plurality (N) of serial information signals 122, each having a predetermined bit-rate B/N (i.e. a total bit-rate B), each of which is input to a corresponding signal generator 124. Each signal generator 124 is configured to encode its input information signal into a corresponding subcarrier signal output 128, which is applied as a modulation input to an optical source 126.

In one embodiment, the signal generators 124 are each configured more specifically to encode groups comprising a number (b) of the input information bits 122 into a sequence of data symbols, and comprise one or more ADCs to convert the sequence of data symbols, having a symbol rate (S), into corresponding analogue signals at output 128. As in the previous embodiment, B/N=Sb, i.e. B=NSb.

According to one embodiment of the transmitter 120, a QAM encoding, such as a 4-QAM encoding, is used by the signal generators 124 to in order to provide the resulting encoded data symbol values. Each QAM symbol value is a complex number representing the amplitude and phase modulation to be applied to the associated optical source 126. It will be appreciated, however, that alternative mapping schemes may be used for encoding of the input data, including, but not limited to, OOK, ASK, PSK, FSK and so forth.

In various embodiments, the output 128 comprises one or more analogue signals, e.g. one, two or four signals that may be used by the source 126 to modulate selected characteristics of an optical carrier, such as intensity, amplitude, phase, and/or frequency in one or two orthogonal polarisation states.

The optical sources 130 have suitable predetermined output optical frequencies (or wavelengths) such that a frequency spacing between the optical fields of adjacent sources is equal to the information symbol rate (S). The modulated optical output signals 130 are input to ports of an optical combiner, in the form of multiplexer 132, which is configured to combine the plurality (N) of input optical signals to generate an output O-OFDM signal 134.

The transmitter 100 is most suitable for generating a relatively large number of orthogonal subcarriers, over a total bandwidth of up to a few tens of gigahertz, where the subcarriers may be efficiently modulated and combined using digital signal processing methods. The transmitter 120 is more suitable for generating a smaller number of higher symbol-rate subcarriers, multiplexed over a bandwidth in excess of 100

GHz. However, in general the two embodiments may be combined, i.e. the signal generators 124 and optical sources 126 of the transmitter 120 may each comprise an embodiment of the transmitter 100.

In accordance with embodiments of the invention, the transmission parameters (N, S, b) are determined so as to improve the performance of an optical transmission system in the presence of nonlinear effects in the transmission channel, e.g. one or more spans of single-mode optical fibre.

In particular, considering that the transmitted optical signal as received at an associated optical receiver has a measurable signal quality (Q), in the presence of nonlinear propagation effects this quality may be a function of the transmission parameters (N, S, b). Embodiments of the invention therefore endeavour to determine a combination of transmission parameters such that the associated received signal quality (Q) is improved relative to prior art systems, in which it has not, to the inventors' knowledge, been shown or suggested that transmission parameter selection can result in significant performance improvements. According to the principles of the present invention, for example, a value for the number of orthogonal subcarriers (N), and a corresponding symbol rate (S), may be found, for a chosen value of the number of bits per symbol (b), such that the received signal quality (Q) is greater than a corresponding quality for a conventional single-carrier transmission system (M=1), and greater than a corresponding quality employing a larger number (M>N) of subcarriers, such as a typical prior art electrically-generated O-OFDM signal. Preferably, an optimal value for the number of subcarriers (N) is chosen such that any increase (i.e. M=N+1) or decrease (i.e. M=N−1) in the number of subcarriers results in a degradation in received signal quality.

The existence of transmission parameters resulting in improved system performance, and in particular of an optimum selection of parameters is now demonstrated with reference to exemplary results of computer simulations of a representative O-OFDM transmission system.

Figure 2:
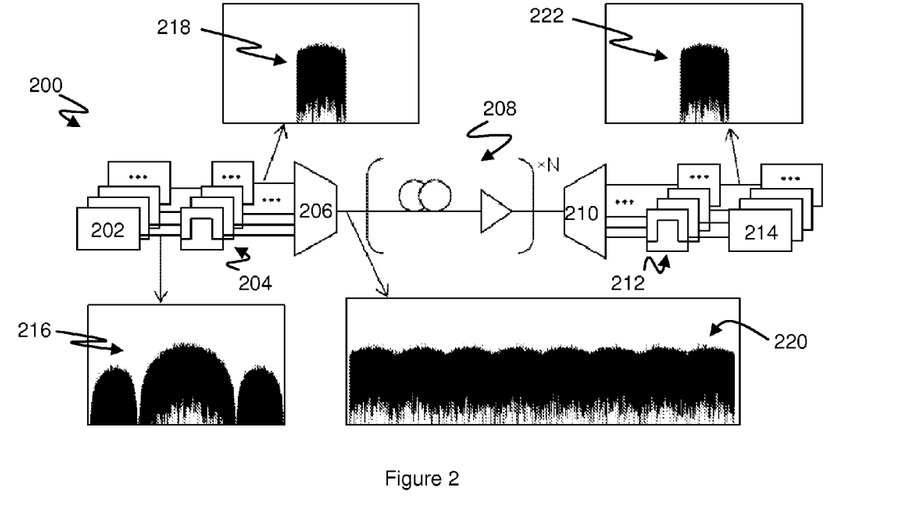
FIG. 2 illustrates schematically a representative transmission system embodying the invention.

FIG. 2 illustrates schematically the representative system 200. Transmitters 202 are implemented in accordance with the embodiment 120 of FIG. 1(b). Each subcarrier is modulated with 4-QAM (b=2) using separate complex Mach-Zehnder Modulators (C-MZM) within the transmitters 202, generating signals having an optical spectrum 216. Each optical subcarrier is passed through a rectangular optical filter 204 with a passband equal to the symbol rate (i.e. a Nyquist filter), resulting in a signal having an optical spectrum 218. An optical multiplexer 206 combines the orthogonally-spaced subcarriers (channel spacing equal to the symbol rate) to form a continuous 400 GHz wide optical super-channel carrying 800 Gb/s on a single polarisation, and having an optical spectrum 220. Persons skilled in the art of optical communications will appreciate that this configuration is similar to an ideal Nyquist WDM system, with the exception that optical filter 204 does not suppress a central spectral region of each subcarrier in order to produce a flat optical spectrum. For simplicity, signals are limited to a single polarisation state, however polarisation diversity or polarisation multiplexed system are also within the scope of the invention.

A transmission link 208 comprises a plurality of spans of single mode optical fibre, including inline EDFA's to boost signal power at the end of each span. In the representative system 200, inline dispersion compensation is not included. Instead, coherent detection is employed, enabling full compensation for linear dispersion effects in the electronic domain. Each fibre span is 80 km in length, and analysis is conducted for links 208 of 800 km, 1600 km and 3200 km. The EDFAs have noise figures of 5 dB. Polarisation mode dispersion (PMD) is neglected, however in a dual polarisation system, PMD may also be compensated electronically.

At the receiver, a WDM demultiplexer 210 separates the channels. Another Nyquist filter 212 rejects residual power from neighboring subcarriers, resulting in optical spectrum 222. Each demultiplexed and filtered channel is received using a coherent receiver 214, in which the local oscillator frequency is identical to that of the corresponding transmit laser. The receivers 214 further include ADC's, configured to sample twice per symbol. The receivers 214 further comprise digital signal processors (DSP's), wherein the bulk of the chromatic dispersion is compensated with a frequency domain equalizer, followed by a 12-tap fractionally-spaced time-domain equalizer (FS-TDE) to compensate for residual dispersion and perform downsampling. A least-mean-squares algorithm (LMS) is implemented in the DSP's to estimate the channel response.

A total of $2^{18}$, or 262144, symbols are simulated, which equates to 65536 symbols per subcarrier (N=4) for a 100-Gbaud (gigasymbols/s) system and 512 symbols per subcarrier (N=512) for a 0.78125-Gbaud system. The received signal quality (Q) is calculated from the spread in the received constellation assuming a Gaussian distribution in each Cartesian coordinate, and the Q values for subcarriers within the central 200 GHz are averaged.

Figure 3:
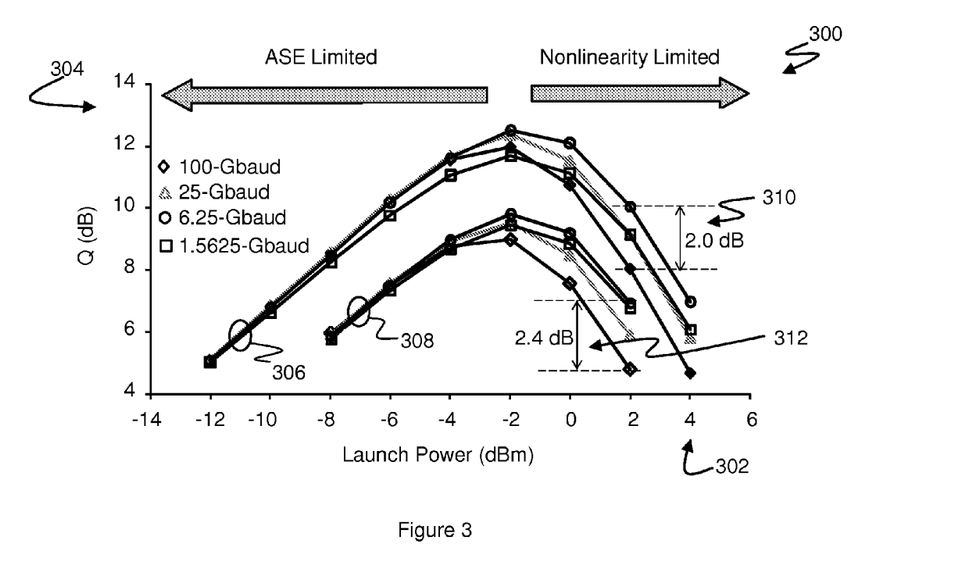
FIG. 3 shows a graph of the received signal quality against transmission power for exemplary systems of three different transmission lengths at four different symbol rates.

FIG. 3 shows a graph 300 of the received Q (vertical axis 304) against the launch power (horizontal axis 302) for 1600-km (306) and 3200-km (308) systems at four different symbol rates (S=1.5625 Gbaud, N=256; S=6.25 Gbaud, N=64; S=25 Gbaud, N=16; and S=100 Gbaud, N=4). At low powers, the systems are limited by amplified spontaneous emission (ASE). In this region, the Q is almost identical for all systems. The 1.5625-Gbaud system shows slightly poorer performance, due to the long impulse response of the filters causing degradation on a large number of symbols. (This effect is even greater for the 0.78125-Gbaud system, as shown in the graph 400 of FIG. 4, discussed below). At high powers, the systems are limited by fibre nonlinearity. The spread of Q is over 2 dB (310, 312) for launch powers of 2 dBm and above. The spread demonstrates that nonlinearity-limited performance is dependent on the symbol rate of the subcarriers and therefore, for a constant information bit-rate, on the number of subcarriers.

Figure 4:
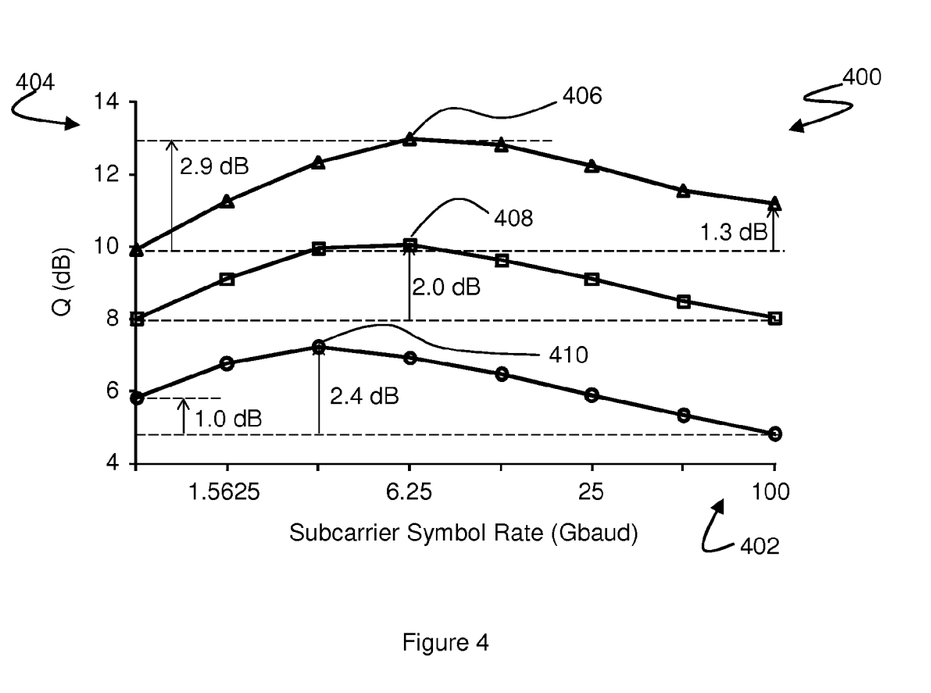
FIG. 4 shows a graph illustrating received signal quality against subcarrier carrier symbol rate for three exemplary transmission lengths and for a transmission power within a nonlinear regime.

FIG. 4 shows a graph 400 illustrating received Q (vertical axis 404) against subcarrier carrier symbol rate S (horizontal axis 402) after 800 km (406), 1600 km (408) and 3200 km (410) for launch power of 2 dBm, which is in the nonlinearity-limited regime of FIG. 2. As can be seen from the graph 400, at 800 km, the optimal symbol rate is S=6.25 Gbaud (N=64). At 1600 km, the optimum symbol rate reduces to between 3.125 and 6.25 Gbaud (N=64 to N=128). At 3200 km, the optimal symbol rate is 3.125 Gbaud (N=128). These results show the optimal symbol rate decreases as the transmission distance is increased. The results shown in the graph 400 confirm that the variation in Q with symbol rate S, and corresponding subcarrier number N, is significant for all transmission distances: choosing the correct baud rate leads to at least a 1.4 dB improvement in performance, compared with opting for a single-carrier (M=1) or a dense-subcarrier system (M>N).

For reconfigurable systems, a preferred number of subcarriers (N) and corresponding symbol rate (S) can be determined online by transmitting training data from a transmitter to a receiver, which is thereby able to measure the received signal quality (Q). By feeding back the results, and varying the transmission parameters at the transmitter, improved, or optimum, transmission parameters can be identified.

For the design of fixed (i.e. non-reconfigurable) systems, a mathematical engineering framework for analysis is useful. In order to meet this requirement, the theory of the nonlinear process of cross-phase modulation (XPM) may be applied, as follows.

The nonlinear Kerr effect in single-mode optical fibre results in phase modulation of propagating signals in response to intensity fluctuations. However, it is known that minimising the Peak-to-Average-Power-Ratio (PAPR) of optical systems at the transmitter is not sufficient to achieve optimal performance in a dispersive link. This can be explained by using XPM theory and by considering the RF spectra of the intensity fluctuations of the signal along the link.

The theory underlying XPM predicts that the efficiency of the nonlinearity-induced phase modulation is reduced for high-frequency intensity fluctuations. The efficiency of XPM for regular fibre spans without inline dispersion compensation is given by:

$$\eta_{XPM} = \frac{\alpha^2}{\alpha^2 + (\omega D \Delta \lambda)^2} \cdot \left[1 + \frac{4\sin^2\left(\frac{\omega D \Delta \lambda L}{2}\right) \cdot e^{-\alpha L}}{(1 - e^{-\alpha L})^2}\right] \cdot \frac{\sin\left(\frac{N\omega D \Delta \lambda L}{2}\right)}{\sin\left(\frac{\omega D \Delta \lambda L}{2}\right)}$$

wherein $\alpha$ is attenuation in Nepers/m, L is the fibre's length, D is the (chromatic) dispersion constant, $\Delta\lambda$ is the wavelength separation between the 'probe' and 'pump' frequencies, $\omega$ is the frequency of the intensity fluctuation and N is the number of spans in the link.

The general characteristics of the XPM efficiency can be explained as follows. Firstly, XPM efficiency decreases at higher frequencies because chromatic dispersion decorrelates the nonlinear products generated at different points along the fibre. The fields of the nonlinearity products generated along the link add vectorially so the net phase modulation is reduced by this decorrelation. Conversely, low-frequency intensity fluctuations cause strong net phase modulation because the nonlinearity products remain phase-aligned (correlated). Therefore, it is only the low-frequency intensity fluctuations that are important.

Secondly, the nonlinearity products are generated throughout the entire link, most strongly following optical amplifiers where the optical power is greatest. Because chromatic dispersion causes the signal waveform to evolve along the link, the cumulative intensity variation along the link should be minimized.

The design focus should therefore be to reduce the low-frequency components of the intensity fluctuations just after each amplifier.

Further simulation studies have confirmed that while the low-frequency intensity fluctuations of higher symbol rate systems remain relatively low at shorter transmission distances, these fluctuations rapidly decrease for longer link lengths. This is because chromatic dispersion causes broadening of symbols, resulting in overlap of adjacent symbols. Overlapping symbols beat together to produce strong intensity fluctuations because low-frequency components of one pulse will overlap with high-frequency components of an adjacent pulse. In the presence of chromatic dispersion, the number of overlapped symbols increases quadratically with the symbol rate. For example, 400 km of standard single-mode-fibre will cause 512 adjacent symbols to overlap in a 100-Gbaud system whereas only two adjacent symbols will overlap in a 6.25-Gbaud system. Therefore, intensity fluctuations increase most rapidly along a dispersive link in systems with high symbol rates. Although a 100-Gbaud system has few nonlinearity products in the first span, it produces the most nonlinearity products in all subsequent spans. This explains why performance of a 100-Gbaud system was the poorest of those analysed at high powers, for all lengths, as shown in the graph 300 of FIG. 3.

As will be apparent from the foregoing discussion, it is possible to employ various modulators, modulation formats and other components in different embodiments of the present invention. Each of the exemplary modulation arrangements disclosed herein provides particular advantages and disadvantages, and an appropriate selection of modulator may be made based on the requirements of a particular application. Importantly, whichever modulation format and/or transmitter architecture is selected, it is possible to optimise transmission parameters to improve received signal quality by comparison with prior art systems.

While the preceding embodiments have assumed that a common symbol rate (S), and a common number of bits per symbol (b), are employed, this is not a necessary restriction upon more general embodiments of the invention. In more general embodiments, a method of transmission of digital information having a predetermined bit-rate (B) via a nonlinear optical channel may comprise determining a combination of transmission parameters comprising a number (N) of subcarriers, an information symbol rate ($S_i$) for each subcarrier ($1 \leq i \leq N$), and a number ($b_i$) of bits per symbol on each subcarrier (i). In this general case, $$B = \sum_{i=1}^{N} S_i b_i.$$

An optical signal may then be generated comprising the plurality (N) of orthogonal optical subcarriers, wherein each subcarrier (i) is modulated to carry a proportion ($S_i b_i/B$) of the total bit-rate (B) of the digital information. The optical signal is transmitted to a corresponding optical receiver via the nonlinear optical channel, wherein the optical signal received at the optical receiver has a measurable signal quality (Q) which is a function of the transmission parameters (N, $S_1$ ... $S_N$, $b_1$ ... $b_N$), and the step of determining the combination of transmission parameters comprises selecting the parameters such that the associated signal quality is greater than a corresponding quality for a single-carrier transmission, and greater than a corresponding quality employing a larger number (M>N) of subcarriers.

It will be clear to those skilled in the art, from the foregoing description, that many variations of the present invention are possible, and that the invention is not to be limited to the particular embodiments described herein. Rather, the scope of the invention is defined by the claims appended hereto.

The invention claimed is:

1. A method of transmission of digital information having a predetermined bit-rate (B) to an optical receiver via a nonlinear optical channel using an optical signal comprising a number (N) of orthogonal subcarriers, each of which carries information at a corresponding symbol rate (S) wherein each symbol encodes a number (b) of information bits such that B =NSb, wherein a measurable received signal quality Q (N, S, b =B/NS) at the optical receiver is a function of N, S and B, the method comprising the steps of:

for each one of a set of values N' for the number of subcarriers and a corresponding set of values S' for the symbol rate for each subcarrier, wherein N'>1 and S'=B/N'b for the predetermined bit-rate B, determining a received signal quality Q' (N', S', B/N'S') corresponding to a predetermined launch power in a nonlinear regime of the optical channel;

selecting the number (N) of subcarriers, and corresponding symbol rate (S) as the ones of the sets of values (N', S') for which the determined received signal quality (Q') is a maximum;

generating the optical signal comprising the plurality (N) of orthogonal subcarriers having the corresponding symbol rate (S) wherein each symbol encodes the number (b) of information bits; and transmitting the optical signal to the optical receiver via the nonlinear optical channel at the predetermined launch power in the nonlinear regime of the optical channel.

2. The method of claim 1 wherein the step of generating the optical signal comprises:

encoding the digital information into a plurality (N) of subcarrier channels, each channel comprising a modulated signal of the information symbol rate (S) and the number of bits per symbol (b);

providing a plurality (N) of optical sources, configured such that a frequency spacing between the optical fields of adjacent sources is equal to the information symbol rate (S);

modulating each optical source with one of said subcarrier channels to produce a corresponding optical subcarrier channel; and optically combining the modulated subcarrier channels to produce an optical Orthogonal Frequency Division Multiplexed (O-OFDM) signal.

3. The method of claim 1 wherein the step of generating an optical signal comprises:

encoding the digital information into a plurality (N) of subcarrier channels, each channel comprising a modulated signal of the information symbol rate (S) and the number of bits per symbol (b);

combining the plurality (N) of subcarrier channels to produce an electrical Orthogonal Frequency Division Multiplexed (OFDM) signal; and modulating an optical source with the electrical OFDM signal to produce a corresponding optical Orthogonal Frequency Division Multiplexed (O-OFDM) signal.

4. The method of claim 1 wherein determining the received signal quality Q' (N', S', B/N'S') comprises performing numerical simulations of transmission of the digital information having the predetermined bit-rate (B) to the optical receiver via the nonlinear optical channel at the predetermined launch power in the nonlinear regime of the optical channel for each one of the sets of values of N' and S'.

5. The method of claim 1 wherein determining the received signal quality Q' (N', S', B/N'S') comprises transmitting test signals of digital information having the predetermined bit-rate (B) to the optical receiver via the nonlinear optical channel at the predetermined launch power in the nonlinear regime of the optical channel for each one of the sets of values of N' and S'.

6. The method of claim 1 wherein the predetermined launch power in the nonlinear regime of the optical channel is greater than -2 dBm.

7. An optical transmitter adapted for transmission of digital information having a predetermined bit-rate (B) to an optical receiver via a nonlinear optical channel using an optical signal comprising a number (N) of orthogonal subcarriers, each of which carries information at a corresponding symbol rate (S) wherein each symbol encodes a number (b) of information bits such that B=NSb, wherein a measurable received signal quality Q (N, S, b =B/NS) at the optical receiver is a function of N, S and B, the transmitter comprising:

a plurality (N) of signal generators configured to encode the digital information into a corresponding plurality of subcarrier channels, each subcarrier channel comprising a modulated signal having the corresponding symbol rate (S) for the predetermined bit-rate B wherein each symbol encodes the number of information bits per symbol (b) determined by:

for each one of a set of values N' for the number of subcarriers and a corresponding set of values S' for the symbol rate for each subcarrier, wherein N'>1 and S'=B/N'b for the predetermined bit-rate B, determining a received signal quality Q' (N', S', B/N'S') corresponding to a predetermined launch power in a nonlinear regime of the optical channel, and selecting the number (N) of subcarriers, and corresponding symbol rate (S) as the ones of the sets of values (N', S') for which the determined received signal quality (Q') is a maximum;

a plurality (N) of optical sources, each having a modulation input operatively coupled to a subcarrier channel output of a corresponding one of the signal generators and configured to modulate an optical carrier with the corresponding subcarrier channel to generate an optical signal output, the plurality of optical sources being configured such that a frequency spacing between the optical fields of adjacent sources is equal to the information symbol rate (S); and an optical combiner having a plurality (N) of optical inputs, each of which is operatively coupled to the optical signal output of a corresponding one of said optical sources, the combiner being configured to combine the modulated subcarrier channels to produce an optical Orthogonal Frequency Division Multiplexed (O-OFDM) signal having the predetermined launch power in the nonlinear regime of the optical channel.

8. An optical transmitter adapted for transmission of digital information having a predetermined bit-rate (B) to an optical receiver via a nonlinear optical channel using an optical signal comprising a number (N) of orthogonal subcarriers, each of which carries information at a corresponding symbol rate (S) wherein each symbol encodes a number (b) of information bits such that B=NSb, wherein a measurable received signal quality Q (N, S, b =B/NS) at the optical receiver is a function of N, S and B, the transmitter comprising:

at least one multiplexed signal generator configured to:

encode the digital information into the number (N) of subcarrier channels, each subcarrier channel comprising a modulated signal having the corresponding symbol rate (S) for the predetermined bit-rate B wherein each symbol encodes the number (b) of information bits determined by:

for each one of a set of values N' for the number of subcarriers and a corresponding set of values S' for the symbol rate for each subcarrier, wherein N'>1 and S'=B/N'b for the predetermined bit-rate B, determining a received signal quality Q' (N', S', B/N'S') corresponding to a predetermined launch power in a nonlinear regime of the optical channel, and selecting the number (N) of subcarriers, and corresponding symbol rate (S) as the ones of the sets of values (N', S') for which the determined received signal quality (Q') is a maximum; and combine the plurality (N) of subcarrier channels to produce an electrical OFDM signal at a multiplexed signal output; and an optical source having a modulation input operatively coupled to the multiplexed signal output and configured to modulate an optical carrier with the electrical Orthogonal Frequency Division Multiplexed (OFDM) signal to produce a corresponding optical Orthogonal Frequency Division Multiplexed (O-OFDM) signal having the predetermined launch power in the nonlinear regime of the optical channel.

9. The transmitter of claim 8 wherein the multiplexed signal generator comprises a frequency-time transformer configured to receive the number (N) of frequency-domain input symbols each comprising the number (b) of information bits, and to generate a corresponding number (N) of time-domain output values comprising the multiplexed signal output.

10. The transmitter of claim 9 wherein the frequency-time transformer comprises a discrete Fourier transform processor.

11. A method of transmission of digital information having a predetermined bit-rate (B) to an optical receiver via a nonlinear optical channel using an optical signal comprising a number (N) of orthogonal subcarriers, carrying information at a symbol rate ($S_i$) for each subcarrier ($1 \le i \le N$), and a number ($b_i$) of information bits per symbol on each subcarrier (i), such that $$B = \sum_{i=1}^{N} S_i b_i$$

wherein each symbol encodes a number (b) of information bits such that B=NSb, wherein a measurable signal quality Q (N, $S_1 \ldots S_N$, $b_1 \ldots b_N$) at the optical receiver is a function of N, $\{S_i\}$ and $\{b_i\}$, the method comprising the steps of:

for each one of a set of values N' for the number of subcarriers and corresponding sets of values ($S_i'$) for the symbol rates for each subcarrier ($1 \le i \le N$) wherein N>1 and $$\sum_{i=1}^{N'} S_i' b_i = B$$

for the predetermined bit-rate B and the number ($b_i$) of bits per symbol on each subcarrier (i), determining a received signal quality Q' (N', $S_1' \ldots S_{N'}', \ldots b_1 \ldots b_{N'}$) corresponding to a predetermined launch power in a nonlinear regime of the optical channel;

selecting the number (N) of subcarriers, and corresponding symbol rates ($S_i$) for each subcarrier ($1 \le i \le N$), and the number ($b_i$) of bits per symbol on each subcarrier (i) as the ones of the sets of values (N', $S_i'$) for which the determined received signal quality (Q') is a maximum;

generating the optical signal comprising the plurality (N) of orthogonal subcarriers, having the corresponding symbol rates ($S_i$) for each subcarrier ($1 \le i \le N$), and the number ($b_i$) of bits per symbol on each subcarrier (i); and transmitting the optical signal to a corresponding optical receiver via the nonlinear optical channel at the predetermined launch power in the nonlinear regime of the optical channel.

12. The method of claim 11 wherein the predetermined launch power in the nonlinear regime of the optical channel is greater than -2 dBm.

* * * * *